United States Patent [19]

Smith

[11] 4,158,313
[45] Jun. 19, 1979

[54] ELECTRIC HAND TOOL

[76] Inventor: Arthur W. Smith, 1845 Randolph St., Los Angeles, Calif. 90001

[21] Appl. No.: 815,190

[22] Filed: Jul. 13, 1977

[51] Int. Cl.² ........................................ F16H 21/00
[52] U.S. Cl. .................................... 74/22 A; 173/47; 408/20
[58] Field of Search ............... 30/122; 74/22 R, 22 A, 74/23, 50, 76; 81/52.35; 144/35 R, 35 A; 173/47, 48, 104, 109, 116, 117, 122, 123; 408/20, 22

[56] References Cited

U.S. PATENT DOCUMENTS

| | | | |
|---|---|---|---|
| 953,651 | 3/1910 | West | 74/22 |
| 954,826 | 4/1910 | Selleck et al. | 173/122 X |
| 1,510,372 | 9/1924 | Ambrosio | 144/35 A X |
| 2,417,170 | 3/1947 | Langfelder | 74/22 X |
| 2,477,755 | 8/1949 | Langfelder | 144/35 R X |
| 2,531,849 | 11/1950 | Karleen | 74/22 A X |
| 2,601,788 | 7/1952 | Parker | 74/22 A X |
| 2,697,946 | 12/1954 | Hardesty | 74/22 R |
| 2,858,701 | 11/1958 | Willcox | 408/20 X |
| 3,456,740 | 7/1969 | Paule et al. | 173/109 |
| 3,841,416 | 10/1974 | Pfister | 408/20 X |

Primary Examiner—Lawrence J. Staab
Attorney, Agent, or Firm—Georges A. Maxwell

[57] ABSTRACT

A power hand tool including a manually engageable housing, a prime mover within the housing, a tool bit engaging chuck projecting from the housing, power transmission means within the housing and between the prime mover and the chuck; said power transmission is operable to selectively drive the chuck rotatively or reciprocally. The chuck is driven rotatively by a tube driven by the transmission and coupled with the chuck for free relative axial movement and for relative circumferential drive; the chuck is driven reciprocally by an eccentric drive means connected with the transmission and coupled with the chuck for free relative rotation and for reciprocal axial drive.

10 Claims, 6 Drawing Figures

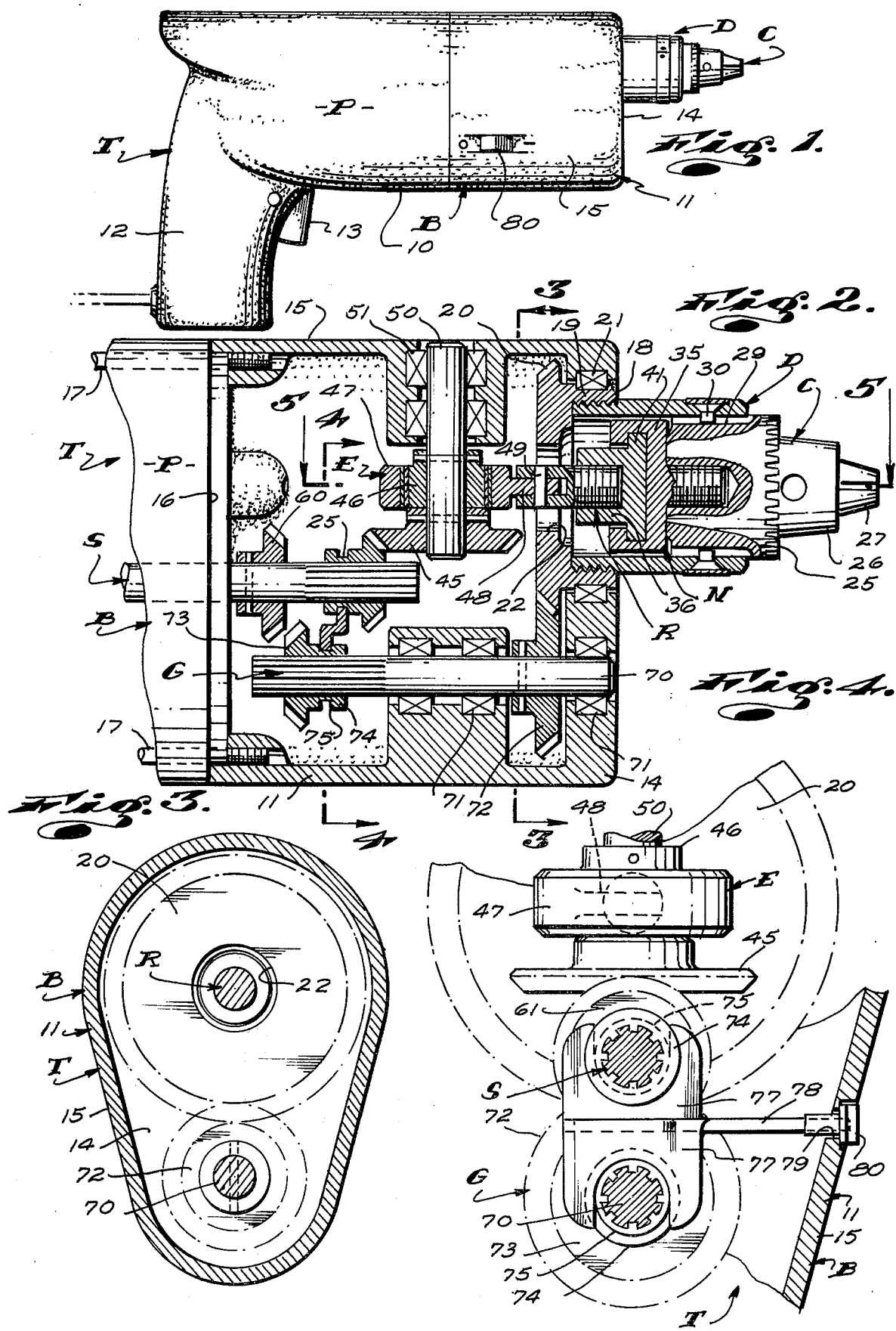

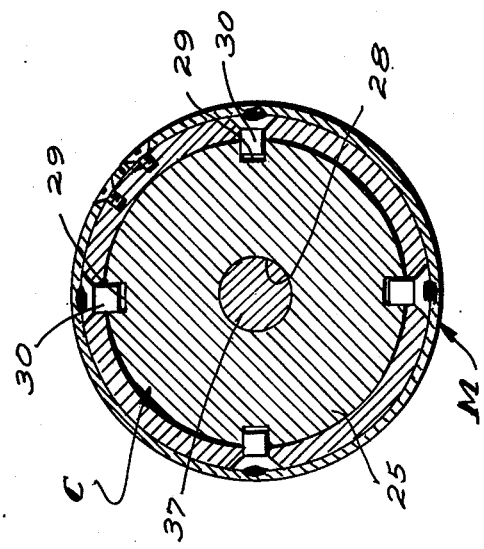
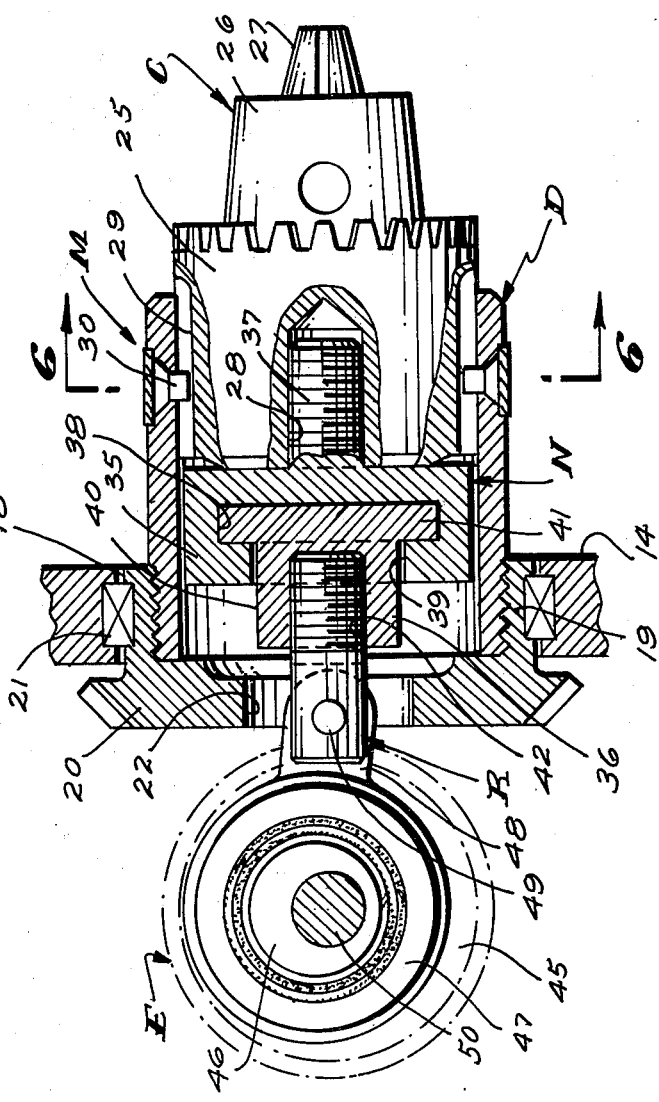

ELECTRIC HAND TOOL

This invention has to do with an improved power operated hand tool and is more particularly concerned with a novel tool for selectively delivering rotary or reciprocating output motion.

In the power operated hand tool art, the most common hand tool is the electric powered drill tool which comprises a manually engageable body in which an electric motor is arranged. The motor has a power output shaft connected with a speed reducing gear train within the body. The gear train has an output shaft projecting from the body and on which a chuck for releasably engaging and holding drill bits is suitably mounted.

The body is commonly provided with a hand grip and with a trigger switch for manually supporting the tool and for energizing the motor.

While drill tools of the character referred to above are most commonly electric powered, such tools are, to a lesser extent, provided with pneumatic and hydraulic motors or prime movers.

Another common type or class of power operated hand tool is that class of tool commonly referred to as a sabre saw. The ordinary sabre saw is essentially the same as the above noted drill tool except that the gear train includes a crank or the like to change rotary motion into reciprocating motion, whereby the output shaft reciprocates. Further, the chuck provided on the output shaft is adapted to engage the hold saw blades or the like. This class of tool is also suitable for driving or reciprocating files, knives and the like.

Yet another, though less common, class of power hand tool is that class of tool which is commonly referred to as the jack hammer or axial impact tool. This class of tool includes a body or case in which a rotary prime mover is mounted, an output shaft which projects from the case and a wobble plate or cam type drive means between the motor and the shaft whereby rotary motion of the prime mover is transformed into intermittent axial outward movement of the output shaft. In such tools, the output shafts are driven in one direction only by the prime mover, that is, axially outward relative to the tool body. In all other respects, impact tools of the character referred to above can be considered essentially the same as power drill tools and sabre saws.

Axial impact tools of the character referred to above are suitable for chiseling operations, peening or light hammering operations and the like. They are not suitable for sawing, filing, sanding or other operations where true reciprocating motion is desired or required.

The want and need for a single dual purpose power tool which provides both rotary and reciprocating motion of the output shaft, whereby the single tool can be used as a drill or as a sabre saw, has long been recognized. The prior art has sought to provide such tools but has failed to provide a tool which satisfies the desires and needs of the public.

One dual purpose power tool of the character referred above is disclosed in my U.S. Pat. No. 2,526,976 issued Oct. 24, 1950 and entitled POWER OPERATED HAND TOOL. This prior art tool is characterized by two output shafts, one of which rotates and the other of which reciprocates. It has been clearly determined that this tool failed to meet with commercial success and was considered undesirable due to the fact that it included two constantly operating output shafts.

In recent years a new class of dual purpose power tool has been introduced into the market place and has met with notable commercial success. This new class of dual purpose hand tool is a combination rotary or drill tool and axial impact tool. It includes but one output shaft which can be selectively made or caused to rotate or to deliver axially outwardly directed impact forces.

The above new class of dual purpose hand tool is suitable for performing normal operations requiring rotary motion and for those operations requiring the delivery of impact forces. It is not suitable or serviceable for performing the many operations requiring reciprocating motion.

Since the number of operations requiring reciprocating motion far exceed the number of operations requiring impact motion, it is clear that a tool capable of delivering rotary and reciprocating motion would find much wider use than a tool providing rotary and impact motion.

An object and feature of the present invention is to provide an improved dual purpose power operated hand tool having a single output shaft and including means for selectively rotating and reciprocating that shaft whereby the tool is serviceable for performing operations requiring rotary and reciprocating motion.

It is an object and feature of my invention to provide a tool of the character referred to above including a rotary drive tube rotatably carried by and projecting from a tool body or housing, a tool chuck slidably engaged in and projecting outwardly from the tube, rotary drive coupling means between the tube and chuck, an eccentric drive means within the body or housing and connected with the chuck to reciprocate the chuck axially relative to the tube, a prime mover with a power shaft within the housing and a gear train within the housing driven by the power shaft and operable to selectively rotate the tube and the eccentric drive means.

It is an object of my invention to provide a dual purpose power operated hand tool of the character referred to above which is strong, durable, dependable in operation and which is easy and economical to make.

The above and other objects and features of my invention will be apparent and fully understood from the following detailed description of one preferred form and embodiment of my invention, throughout which description reference is made to the accompanying drawings, in which:

FIG. 1 is a side elevational view of the tool that I provide;

FIG. 2 is an enlarged detailed sectional view of a portion of the tool shown on FIG. 1;

FIG. 3 is a sectional view taken as indicated by line 3—3 on FIG. 2;

FIG. 4 is an enlarged detailed sectional view taken as indicated by line 4—4 on FIG. 2;

FIG. 5 is an enlarged detailed sectional view taken substantially as indicated by line 5—5 on FIG. 2; and FIG. 6 is a detailed sectional view taken as indicated by line 6—6 on FIG. 5.

Referring to the drawings, the tool T that I provide includes a body or housing B having a rear section 10 and a front section 11. The rear section 11 of the housing B is an elongate shell-like unit with front and rear ends and has a hand grip 12 depending from its rear end portion.

The rear section 10 envelopes and carries a rotary prime mover (not shown) which is under control of a trigger switch 13, suitably related to the hand grip 12.

The motor or prime mover includes a power shaft S which projects forwardly through and from the front end of the section 10 and into the rear portion of the section 11.

For the purpose of this disclosure, the rear section of the housing with its prime mover and forwardly projecting power shaft S will hereinafter be referred to as the power unit P. In practice, the prime mover in the power unit P can be an electric motor, pneumatic motor or hydraulic motor without departing from the spirit of my invention.

The front section 11 of the housing A is a rearwardly opening shell-like unit with a front wall 14 and a side wall 15. The side wall projects rearwardly from the front wall to register with and seat in an outwardly and forwardly opening seat 16 about the perimeter of the front end of the rear section 10 or power unit P.

The front section 11 and unit P are normally releasably secured and held together in assembled relationship, by suitable screw fastening means 17, in accordance with common practice.

The front wall 14 of the housing section 11 is provided with a large primary opening 18, in which an annular output flange 19 of a rotary output gear 20 is rotatably supported by suitable bearing means 21. The bearing means 21 can be anti-friction ball or roller bearing units or can be sleeve bearing units, as desired, or as circumstances require.

The gear 20 is a large diameter bevel gear and occurs within the forward portion of the housing section 11 and is provided with a central opening or port 22 to accommodate parts of an eccentric drive means E, as will hereinafter be described.

The gear 20 is provided with, or is connected with, and carries an elongate forwardly projecting drive tube D, which tube projects freely forwardly from the front wall 15 of the section 11.

In the case illustrated, the rear end of the tube D is threaded into the bearing supported annular output flange 19 of the gear 30. It will be apparent that the tube D could be integrally formed with the flange 19, as an extension thereof, or that the tube D could simply replace the flange 19 and connect directly with the gear 20. In the latter case, the tube D would be rotatably supported by the section 11 and the gear 20 would be fixed to the rear end of and carried by the tube. Such modification of the construction would in no way affect the novelty of my invention.

The tool T next includes a tool or bit engaging chuck C. The chuck C is preferably a conventional Jacobs type chuck and is characterized by an elongate cylindrical body 25 with front and rear ends, a jaw cone 26 within and projecting forwardly from the body and a set of jaws 27 within and projecting forwardly from the cone 26. The rear end of the body 25 is provided with a central threaded spindle receiving opening 28. Since the general type or class of chuck here provided is well known to those skilled in the art to which this invention relates, further description of the chuck and its operation would only serve to unduly burden this disclosure. Accordingly, further deatiled consideration of the chuck will be dispensed with.

The rear end portion of the chuck body 25 is slidably engaged in the forward open end portion of the tube D for free relative axial shifting and is coupled with the tube D against relative rotation by suitable rotary coupling means M. The rotary coupling means M can be in the nature of a spline coupling between the tube and the chuck and can, as shown, include a plurality of circumferentially spaced, elongate, axially extending radially outwardly opening grooves 29 machined or otherwise established in and about the chuck body and radially inwardly projecting drive pins 30, carried by the tube D and slidably engaged in the grooves 29 in the chuck body.

The number and size of grooves 29 and of pins 30 can vary. Further, the exact nature and form of the pins 30 can be varied without departing from the spirit of the invention.

The invention here provided next includes axial coupling means N to connect with the body 25 of the chuck C and with the aforementioned and yet to be described eccentric drive means E. The axial coupling means N affords for free relative rotation and provides for positive axial drive between the chuck and a reciprocating drive rod R, spaced rearward of and in axial alignment with the chuck.

The axial coupling means N includes a driven section 35 secured to the rear end of the chuck body 25 and a drive section 36 secured to the front end of the rod R and engaged in or with the section 35. One of the sections 35 and 36 is a female section and the other of said sections is a male section. In the case illustrated, the section 35 is the female section and the section 36 is the male section. The female section 35 has a cylindrical body with front and rear ends, a threaded spindle 37 projecting from its front end and engaged in the spindle opening 28 in the chuck body 25, a cylindrical chamber or cavity 38 with flat radially disposed front and rear surfaces within the body and a central access opening 39 of reduced diameter entering the rear of the body and communicating with the cavity. The male section includes an elongate stem 40 extending freely through and rearwardly from the opening 39 and an enlarged cylindrical disc like drive head 41 with flat front and rear surfaces on the front end of the stem and engaged within the cavity 38 for free relative rotation relative to the female section and for positive axial driving engagement therewith.

The rear end of the stem has a threaded opening 42 in which the forward end of the reciprocating drive rod R is engaged. The rod R projects rearwardly and freely through and from the opening 22 in the gear 20.

The eccentric drive means E includes a driven gear 45 rotatably supported in the section 11 on an axis normal to and rearward of the rod R, an eccentric drive disc 46 driven by the gear 45, a drive ring 47 rotatably engaged about the disc 46 and a radially outwardly projecting crank arm 48 on the ring, which arm is pivotally connected with the rear end of the rod R by a suitable connecting pin 49.

The eccentric drive disc 46 is eccentric with respect to the axis of the gear 45 and can be such that it imparts (for example) ¼" axial reciprocating motion to the arm 48, rod R, coupling means N and chuck C upon rotation of the gear 45.

With the structure set forth above, it will be apparent that if and when the rotary output gear 20 is driven and rotated, the chuck C and any tool or bit carried by the chuck are rotated and that when the driven gear 45 is driven and rotated, the chuck C and any tool carried by the chuck are reciprocated axially.

In the case illustrated, the gear 45 is fixed to a shaft 50 rotatably carried by the section 11 by suitable bearing means 51 and the eccentric disc 46 is fixed to and carried by the shaft 50, adjacent the gear 45.

Further, the free rear end of the rod R is bifurcated or slotted and the free forward end of the arm 48 is engaged in the slotted end of the rod. The pin 46 is engaged through the rear end of the rod and through the free end of the arm to pivotally connect the rod and arm together.

In practice, the construction, number and relationship of parts going to make the means E, can be altered or changed to a substantial extent or degree, as desired, or as circumstances require, without departing from the spirit of my invention. For example, the eccentric disc 46 could be replaced by a more common form of crank shaft type structure and the ring 47 and arm 48 could be replaced by a more common form of connecting rod type structure without departing from the spirit of this invention.

The present invention next includes a suitable speed reducing and selector type gear train or power transmission means G. The means G is arranged within the housing section 11 between the power shaft S of the power unit P and the gears 20 and 45.

While the means G can be varied considerably as regards the proportioning, arrangement of parts and the details of construction, one typical preferred form and arrangement of parts going to make up that means is illustrated in the drawings.

The means G illustrated includes first and second drive gears 60 and 61 on the forward end of the shaft S, within the housing section 11. The gear 60 is fixed to the shaft S rearward of the gear 61. The gear 61, forward of the gear 60, is splined to the shaft S and is shiftable axially thereon to and from forward and rear positions. The gear 61, when in its forward position on the shaft S, establishes meshed driving engagement with the driven gear 45 and is out of driving engagement with the gear 45 when shifted to its rear position.

The gears 45 and 61 are beveled gears and the gear 61 is smaller in diameter than the gear 45 whereby drive between the right angularly related gears and appropriate speed reduction is effected.

The means G next includes an elongate counter shaft 70 rotatably supported in the housing section 11 by suitable bearing means 71. The shaft 70 is arranged on an axis parallel with and laterally offset from the axes of the shaft S and the gear 20.

The counter shaft has a beveled drive gear 72 fixed to its forward end portion. The gear 72 is meshed with and is in driving engagement with the rotary output gear 20. The gear 70 is smaller than the gear 20 to afford desired speed reduction. The counter shaft 70 next carries a driven gear 73 at its rear end portion. The gear 73 is splined to the shaft 70 for free axial shifting thereon and is shiftable from a forward position where it is spaced from and clear of the drive gear 60 on the shaft S to a rear position where it establishes meshed driving engagement with the gear 60. The gears 60 and 73 are beveled gears.

The axially shiftable gears 61 and 70 on the shafts S and 70 are preferably shifted to and from their forward and rear positions together, whereby the chuck is selectively driven rotatatively or reciprocally. To the above end, the gears 61 and 73 are provided with axially extending hubs 74 having radially outwardly opening annular channels 75 and a gear selector carriage 76 with a pair of oppositely disposed forks 77 is arranged between the shafts S and 70 with the forks engaged in the channels 75 of the gears 61 and 73. The carriage 76 is provided with an elongate operating arm 78 projecting laterally outwardly through a slotted opening 79 in the side wall 15 of the housing section 11 and on which a finger or thumb-engaging selector pad 80 is engaged. By manually engaging the pad 80 and shifting the pad and the carriage 76 forwardly or rearwardly, the gears 61 and 73 are shifted to their forward or rear position, as desired.

If desired, a separate carriage fork and thumb pad structure could be provided for each gear 61 and 73, whereby one, the other or both gears 61 and 73 could be engaged with related driven gears, if desired. With such a structure and relationship of parts, the tool could be operated to deliver rotary motion, reciprocating motion or both rotary and reciprocating motion simultaneously.

It is important to note that only the two splined gears 61 and 73 are shiftable and that all other gears in the construction are and remain on fixed planes.

With the structure disclosed in the drawings and described in the foregoing, it will be apparent that I have invented and provide a novel highly effective dual purpose power tool which is capable of imparting both rotary and reciprocating output motion. Further, the structure that I provide lends itself to the establishment of a rugged and durable product at modest cost.

Having described only one typical preferred embodiment of my invention, I do not wish to be limited to the specific details herein set forth, but wish to reserve to myself any modifications and/or variations which might appear to those skilled in the art and which fall within the scope of the following claims.

Having described my invention, I claim:

1. A power tool comprising an elongate manually engageable housing with front and rear ends and defining a longitudinal axis of the tool, an elongate axially extending rotary drive tube rotatably supported by the housing and having a rear end portion accessible from within the housing and a forward portion projecting forwardly from the housing, an elongate chuck with a rear portion projecting into the tube and a forward tool bit engaging portion projecting forwardly from the tube, rotary coupling means between the tube and the chuck establishing rotary driving engagement therebetween, an axially shiftable drive member rearward of the chuck, axial coupling means between the chuck and the member establishing axial driving engagement therebetween, said axial driving engagement being substantially free of lost motion between said drive member and said chuck, a prime mover in the housing, a power transmission connected with the prime mover and including an eccentric drive means connected with said member and a rotary driven element connected with the tube.

2. The tool set forth in claim 1 wherein said rotary coupling means includes axially extending radially outwardly opening grooves in the chuck and radially inwardly projecting drive parts on the tube and engaged in the grooves.

3. The tool set forth in claim 2 wherein the axial coupling means includes an elongate axially extending female section with a cavity defining forwardly and rearwardly disposed drive surfaces and an elongate axially extending male section with a drive head with forwardly and rearwardly disposed drive faces rotatably engaged in the cavity and means connecting one of said sections with the chuck and the other section with said member.

4. The tool set forth in claim 1 wherein the axial coupling means includes an elongate axially extending female section with a cavity defining forwardly and rearwardly disposed drive surfaces and an elongate axially extending male section with a drive head with forwardly and rearwardly disposed drive faces rotatably engaged in the cavity and means connecting one of said sections with the chuck and the other section with said member.

5. The tool set forth in claim 1 wherein said prime mover has a rotary drive shaft, said power transmission including a first gear train connected with and between the drive shaft and the tube, one gear of said first gear train being shiftable into and out of driving engagement with a related gear in that gear train, a second gear train connected with and between the drive shaft and said eccentric drive means, one gear of said second gear train being shiftable into and out of driving engagement with a related gear in that gear train and manually operable means coupled with the shiftable gears of the first and second gear trains to shift those gears whereby driving engagement of those gears with related gears can be selectively made and broken.

6. The tool set forth in claim 5 wherein said rotary coupling means includes axially extending radially outwardly opening grooves in the chuck and radially inwardly projecting drive parts on the tube and engaged in the grooves.

7. The tool set forth in claim 6 wherein the axial coupling means includes an elongate axially extending female section with a cavity defining forwardly and rearwardly disposed drive surfaces and an elongate axially extending male section with a drive head with forwardly and rearwardly disposed drive faces rotatably engaged in the cavity and means connecting one of said sections with the chuck and the other section with said member.

8. The tool set forth in claim 5 wherein the axial coupling means includes an elongate axially extending female section with a cavity defining forwardly and rearwardly disposed drive surfaces and an elongate axially extending male section with a drive head with forwardly and rearwardly disposed drive faces rotatably engaged in the cavity and means connecting one of said sections with the chuck and the other section with said member.

9. The tool set forth in claim 8 wherein the eccentric drive means includes a drive arm carried by a sleeve and pivotally connected with the drive member and a rotary part with the sleeve rotatably supported on an eccentric axis; the first gear train includes a first drive gear on the drive shaft and a first driven gear connected with the rotary part concentric with the rotary axis and engageable with the first drive gear; said second gear train includes a second drive gear on the drive shaft, a second driven gear engageable with the second drive gear, an intermediate gear rotatably connected with the second driven gear, said rotary driven element connected with the tube being an output gear engaged with said intermediate gear.

10. The tool set forth in claim 9 wherein the second driven gear and intermediate gear are on a counter shaft and wherein said first drive gear and second driven gear are shiftable axially on their related shafts.

* * * * *